Sept. 21, 1965  F. L. F. STEGHART ETAL  3,207,963
MOTOR CONTROLLED REGULATING SYSTEM Filed Feb. 2, 1961  4 Sheets-Sheet 1

INVENTORS:
FRITZ LUDWIG FELIX STEGHART
TREVOR EXELBY OLIVER
By
Richardson, David and Nordon
ATTYS.

Sept. 21, 1965   F. L. F. STEGHART ETAL   3,207,963
MOTOR CONTROLLED REGULATING SYSTEM
Filed Feb. 2, 1961   4 Sheets-Sheet 3

INVENTORS
FRITZ LUDWIG FELIX STEGHART
TREVOR EXELBY OLIVER
BY
Richardson, David and Nordon
ATTYS.

United States Patent Office 3,207,963
Patented Sept. 21, 1965

3,207,963
MOTOR CONTROLLED REGULATING SYSTEM
Fritz Ludwig Felix Steghart, St. Albans, and Trevor Exelby Oliver, Windsor, England, assignors to Satchwell Controls Limited, Slough, England
Filed Feb. 2, 1961, Ser. No. 86,783
Claims priority, application Great Britain, Feb. 15, 1960, 5,353/60
9 Claims. (Cl. 318—29)

The present invention relates to improvements in electronic controllers and has more precisely as its object to provide an additional circuit for such electronic controllers where it is desired to limit the upper or lower level of a physical value that is associated with the control circuit operated on by the main controller. This physical value may, as is known, be temperature, flow, pressure, humidity or the like. The medium on which the limit is imposed is not necessarily the same medium which the controller is controlling (heat exchangers), but obviously it must be a medium which is influenced by the correcting unit of the main controller. In the specific example of temperature control, it is often very desirable to set a lower limit for the temperature of the inlet air in the case of control of temperature by means of air circulation and similarly, in the case of control of temperature by a hot water system, it is sometimes desirable to limit the maximum temperature of the water.

More particularly, the invention conveniently relates to electronic controllers having the type of input that is provided by a bridge circuit, such bridge being balanced when the measured valve is correct and the output of the bridge being dependent upon the deviation of the measured value from the desired value. With a bridge energised by direct current, the polarity of the bridge output changes between positive and negative deviations, whereas with a bridge energised by alternating current, the phase of the bridge output changes by 180° between positive and negative deviations.

According to the present invention there is provided a limit circuit for use in electronic controllers and comprising a bridge circuit whose output is connected in series with the input to the electronic controller, the bridge thereof including in at least one of its arms a sensing element adapted to be influenced by the physical value of the medium to be limited and the bridge circuit giving an output only when out of balance in one direction.

Thus it will be understood that when the bridge is unbalanced in one direction, that is to say when the physical value to be controlled is on the correct side of the limiting value, the bridge gives no output so that its presence does not affect the operation of the main controller. On the other hand, when the bridge is out of balance in the other direction, since the physical value to be limited is on or is tending to exceed the limit, the bridge will give an output which is supplied to the input of the main controller effectively to offset the desired operating point of the main controller.

It is clearly desirable to the able to adjust the limit value as set on this second bridge, that is to say the balance point of the bridge, and it is also desirable to adjust the output of the bridge for any given deviation.

In an alternative arrangement, the output from the limit circuit bridge may be backed off against a standing current in such a way that no output is provided unless the physical value to be limited tends to exceed the limit.

In order that this invention may more readily be understood, certain embodiments of the same will now be described with reference to the accompanying drawings.

Figure 1:
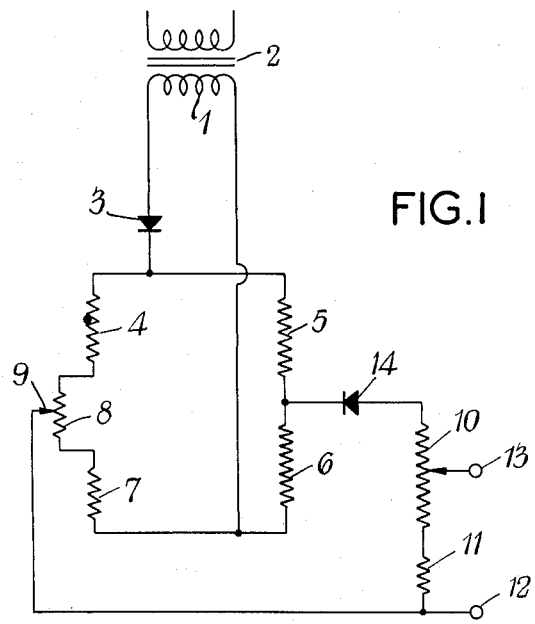
FIGURE 1 is a circuit diagram showing a limit circuit in accordance with the present invention and designed for alternating current energisation.

Referring now to the drawings and in particular to FIGURE 1, a mains transformer 2 has a secondary winding 1 for providing the power supply to the bridge and a half-wave rectifier 3 is in series in the power supply so that the bridge is actually energised with a pulsating current in the form of half-wave unsmoothed rectified alternating current. The bridge itself consists of a temperature sensitive element 4, two ratio arms 5 and 6 and the fourth arm of the bridge represented by the resistor 7. Resistors 4 and 7 are joined by a potentiometer 8 and the slider 9 of this potentiometer may be moved to adjust the balance point of the bridge and thereby to adjust the desired limit temperature.

The output from the bridge is taken from the slider 9 and between the resistors 5 and 6 and this output passes through a half-wave rectifier 14, a potentiometer 10 and a fixed resistor 11. The output from the bridge circuit is taken from the point 13 which is the slider of the potentiometer 10 and a point 12 which is the junction between the resistor 11 and the slider 9 and this output being connected in series with the input to the main controller.

Considering this bridge circuit as a whole, the wave form applied to the bridge at the junctions between the resistors 4 and 5 and the resistors 6 and 7 will, as explained above, be half-wave rectified unsmoothed alternating current and in dependence upon the direction in which the bridge is unbalanced the output voltage will be the same phase or 180° out of phase with the input. The selection is made so that if the resistor 4 is at a temperature above the limit value, the output will be in phase but the rectifier 14 is so connected that it will not pass this current and will only pass the current if it is out of phase, that is to say if it has suffered an inversion in the bridge circuit. Consequently, the circuit shown in FIGURE 1 provides zero output for temperature above the lower limit value, whereas for temperatures below the limit value an output appears at terminals 12 and 13 and the dependence of this output upon deviation is clearly set by the potentiometer 10. The limit value is set by the potentiometer 8.

Figure 2:
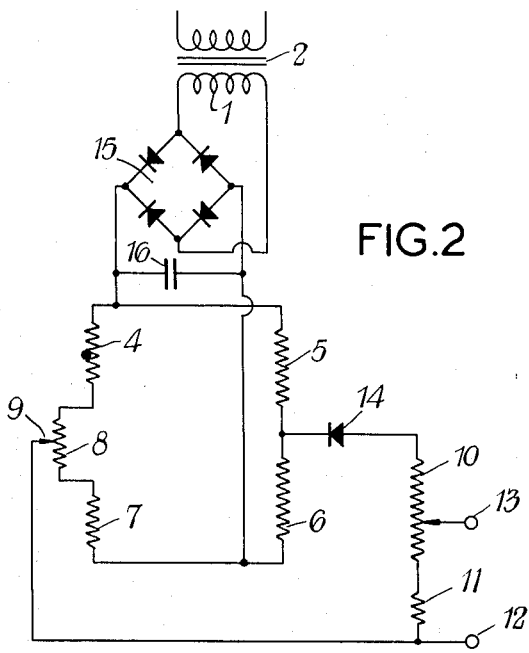
FIGURE 2 shows a similar circuit for direct current energisation.

FIGURE 2 shows the circuit as applied to a direct current energised bridge and it will be seen that it is substantially the same as FIGURE 1, except that the half-wave rectifier 3 is replaced by a full-wave bridge rectifier 15 and a smoothing capacitor 16. The bridge output will be a positive or negative voltage depending upon the direction of deviation and the rectifier 14 will only permit the negative current to flow.

Figure 3:
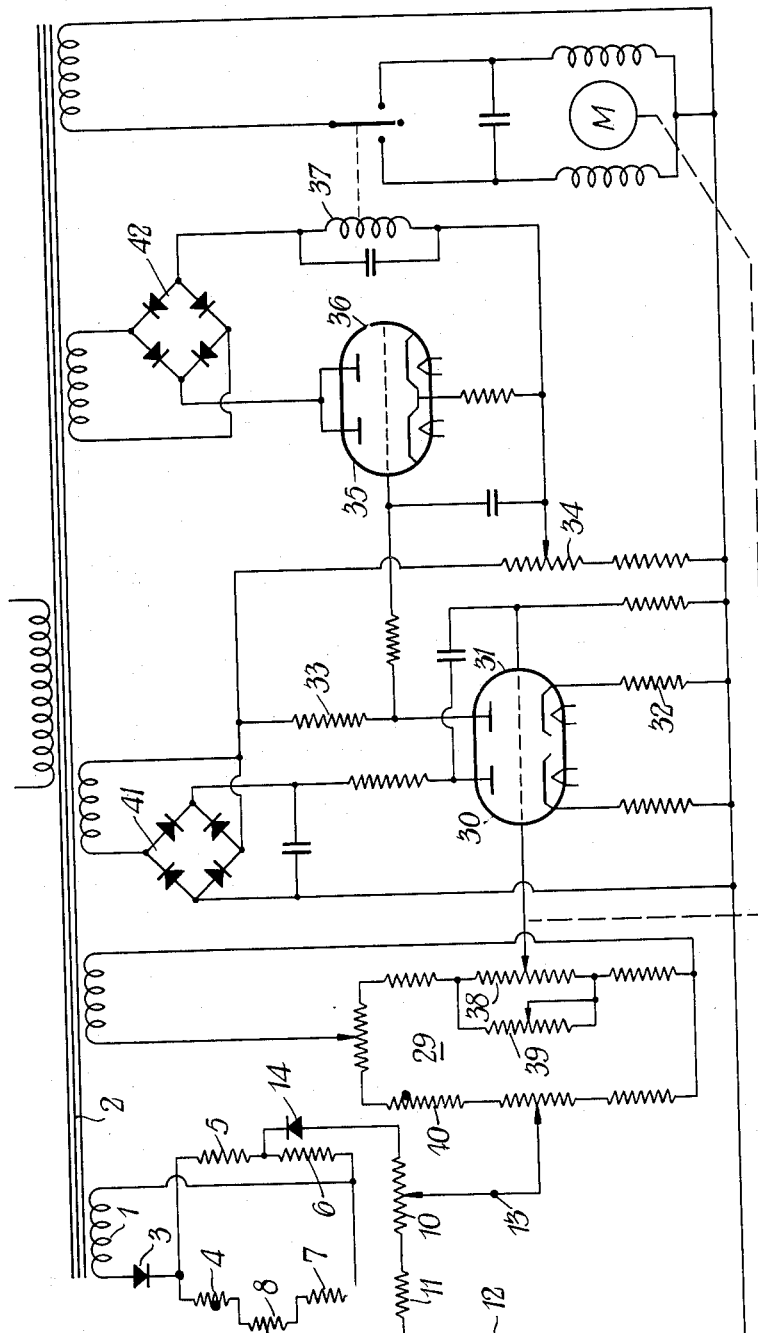
FIGURE 3 shows a simple controller incorporating the circuit of the present invention.

FIGURE 3 shows the circuit of FIGURE 1 incorporated in a single proportional controller. This particular controller is designed to control the temperature of a space such as a room, building or the like, making use of a temperature sensing element, the space being heated by hot air from a discharge duct. The temperature in the space is controlled by a throttling valve in the steam supply to a heat exchanger over which the air is blown and in this type of installation it is highly desirable to control the lower limit of temperature of the air so that it does not drop to a level which will cause discomfort. If, for any reason, a lot of heat is being dissipated in the space so as to tend to raise its temperature, the main controller may turn off all steam to the heat exchanger with the result that air is blown in at outside temperature which is obviously undesirable. The action of the limit circuit of the present invention is to maintain enough steam to the heat exchanger to prevent the incoming air dropping below a specified temperature and to this end the detecting element for the limit circuit is located in the air duct.

To describe firstly the action of the circuit of FIGURE 3 with the limiting control ineffective, it will be seen that the multiwinding mains transformer 2 provides an alternating current input to a bridge circuit 29 which includes a temperature sensing resistor 40. The output from the bridge changes its phase by 180° according to the direction of the error and the output is zero when the bridge is balanced. This output, which is taken from the slider of the potentiometer 38, is passed to the grid of a triode valve 30 of a twin triode and is there amplified, the anode supply to this valve being direct current and being derived from a bridge rectifier 41. The output from the valve 30 is coupled to the grid of a triode valve 31, this triode having an anode voltage which is half-wave rectified unsmoothed alternating current so that the valve will only conduct on one half of the cycle. Due to the constant current passing through the cathode resistor 32, the grid is biased negatively on the active half-cycle so that it is able to accept positive or negative signals. It will be apparent that an input signal in phase with the anode current will cause an increase in the output current, whereas a signal 180° out of phase will cause a decrease in the output current. The output signal is produced across the anode resistor 33 and is, therefore, a half-wave voltage of an amplitude depending upon the phase of the error signal and this voltage is backed off by the half-wave voltage produced across a potentiometer 34, the resultant voltage being fed to the grids of two triode valves 35 and 36 which are connected in parallel. These valves 35, 36 have a common anode supply drawn from a full-wave rectifier 42 and the output current passes through a three-position relay 37. The value of the output voltage for zero error is adjusted by means of the potentiometer 34 until the output current sets the relay 37 in its middle or neutral positon for zero error.

The operation of the circuit is that on the detecting element 40 sensing that the temperature is too low, the bridge 29 will give an ouput current which is amplified as described to cause the relay 37 to close to one of its control contacts thereby to energise a motor M to turn the same in the direction to open the regulating valve and also move the slider of the potentiometer 38. This slider moves until the bridge is rebalanced, thus giving a movement which is proportional to the value of the error signal and the proportional band or sensitivity of the controller is set by a variable resistor 39 in parallel with the potentiometer 38.

With the limit circuit operative, when the duct temperature drops below the desired limit value, an output is provided across terminals 12 and 13 as described with reference to FIGURE 1. This signal is passed through the controller as though it were an output from the bridge 29 and causes the relay 37 to open the regulating valve so that the motor M runs and the slider of the potentiometer 30 is moved. This slider will move to unbalance the bridge 29 until this bridge produces a signal which is equal and opposite to the signal from the limit bridge, when the motor will come to rest. The amount of movement is proportional to the proportional band set by the variable resistor 39 modified by the ratio of the outputs of the two bridges.

Figure 4:
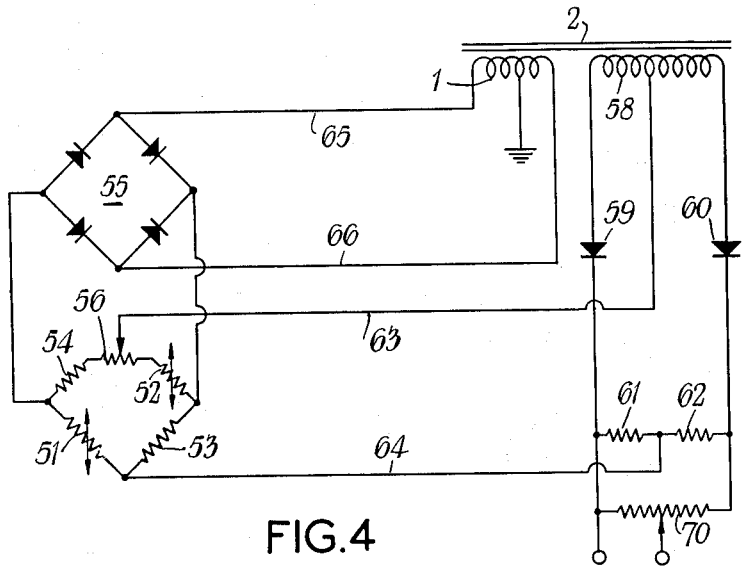
FIGURE 4 shows an alternative embodiment.
Figure 5:
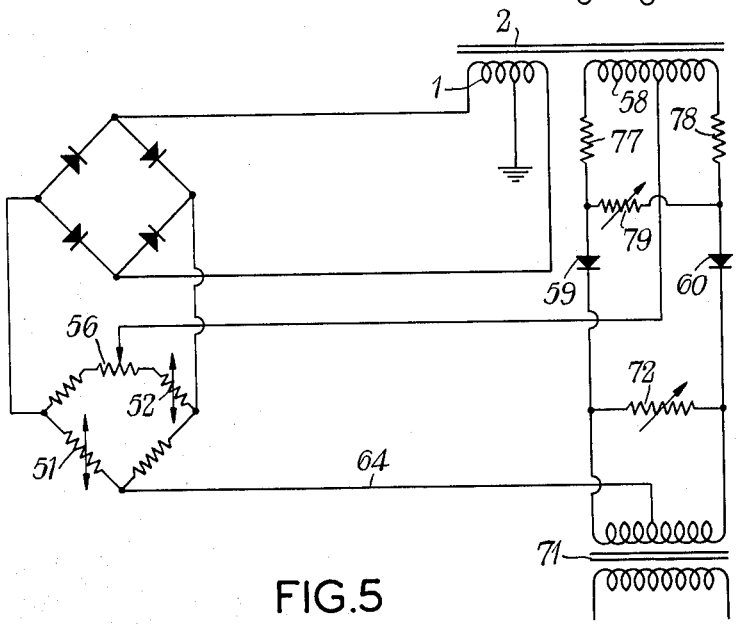
FIGURE 5 is a modification of FIGURE 4.
Figure 6:
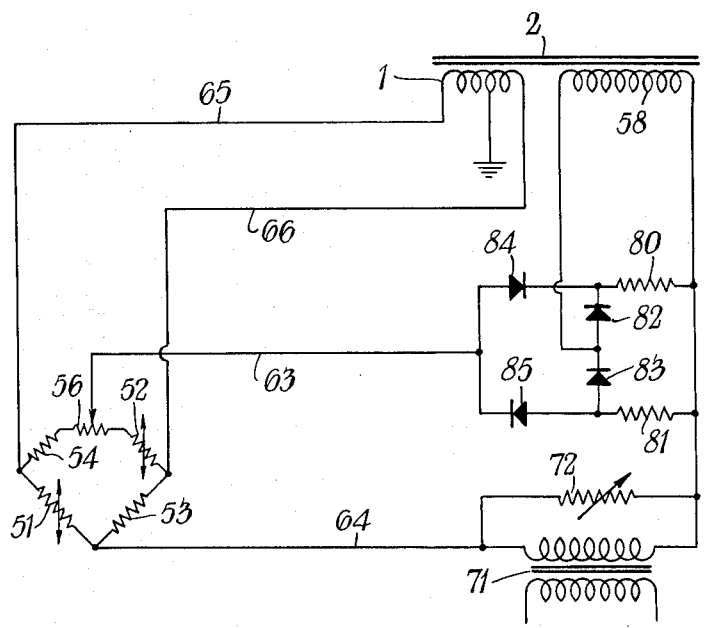
FIGURE 6 is a further modification of FIGURE 4.

The arrangements to be described with reference to FIGURES 4, 5 and 6 show low limit circuits designed to provide an alternating current signal in response to a temperature change from a predetermined temperature but, as will be understood from what has been described previously, this signal is only given in the event of decreasing temperature but with minor modifications to the circuit the signal could be given for increasing temperature.

In the circuit of FIGURE 4, there is provided a temperature measuring bridge in which arms 51, 52 are temperature sensitive resistances located in the space whose low limit of temperature it is desired to control and this space may be for example an air duct, the use of two temperature sensitive arms giving an increased signal. Arms 53, 54 of the bridge are fixed resistors and a potentiometer 56 provides means for setting the desired value of the operating temperature. The bridge is supplied with a full wave rectified alternating current voltage from a bridge rectifier 55 which is energised by the winding 1 on the transformer 2 via leads 65, 66.

A second winding 58 is provided on the transformer 2 and is connected at its ends to two silicon diodes 59, 60 connected in push-pull relationship and thence to two equal resistors 61 and 62 so that a full wave rectified voltage of constant magnitude is provided between the centre tapping of the winding 58 and the common point of the two resistors 61 and 62. The output points of the bridge are connected to these points by leads 63 and 64 respectively.

It is arranged that when the temperature in the air duct equals or exceeds the desired value as set by the potentiometer 56, the output voltage from the bridge equals or exceeds the voltage between the winding 58 and the resistors 61 and 62 and is in opposition to it, so that under these conditions there is zero current flow in the resistors 61, 62. On the other hand, when the temperature in the duct falls below the desired value, the output voltage from the bridge will be less than this constant voltage and an unbalance current will therefore be permitted to flow in the resistors 61, 62 in alternate half-cycles. The alternating voltage thus produced across the ends of the resistors 61, 62 constitutes the input limit signal for a controller and this input signal component may be attenuated by means of a potentiometer 70.

It will be apparent that in this circuit the arrangement is symmetrical with respect to the centre tapping on the winding 1 which is therefore conveniently earthed so that any pick up coupling between the external leads 63, 64, 65 and 66 and an adjacent voltage source such as power cables, will not give rise to spurious output signals from the circuit.

An alternative arrangement is shown in FIGURE 5 where the winding 58 is connected directly to equal resistors 77 and 78 which in turn are connected by a variable resistor 79, the diodes 59, 60 being connected as shown. Since the accuracy of the desired value setting as set by the potentiometer 56 depends on the ratio of the voltages produced by the windings 1 and 58 and also on the magnitude of the forward drops in the diodes 59, 60, adjustment means is provided for these factors by the adjustable shunt resistor 79. The signal that is derived is fed to the primary winding of a transformer 71, the centre tapping of this primary winding being connected to the lead 64 and an attenuating variable resistance 72 being provided across the primary winding.

A further circuit which provides a low limit feature similar to that previously described is shown in FIGURE 6, in which there is provided a temperature measuring bridge with two fixed arms 53, 54 and two temperature sensitive arms 51, 52 as in FIGURE 4. The bridge is supplied with alternating current from the winding 1 on the transformer 2 via the leads 65 and 66 and an alternating current output is produced having a phase angle of 0 or 180 degrees depending on whether the measured temperature is higher or lower than the predetermined value as set by the potentiometer 56.

The bridge output is fed via the leads 63 and 64 to the primary of an input transformer 71, via a section of the circuit comprising four silicon diodes 82, 83, 84 and 85 and two equal resistors 81 and 82. An alternating voltage derived from the winding 58 on the mains transformer is applied between the junction of the diodes 82 and 83 and the junction of the resistors 80 and 81.

The operation of the circuit is such that current is only permitted to flow to the input transformer 71 when the phase of the output signal from the bridge corresponds in a given sense to that of the voltage derived from the winding 58.

The operation may be described in more detail as follows. The voltage from the winding 58 via the diodes 82 and 83 causes current to flow in alternate half cycles in resistance 80 and resistance 81 respectively. The voltage from the output terminals of the bridge also tends to cause current to flow, in alternate half cycles, in resistors 80 and 81 respectively via the diodes 84 and 85. If, however, the phase of the bridge output voltage is so related to that from the winding 58 that both voltages tend to cause current to flow in the same resistor in a given half cycle, the current flow due to the winding 58 produces a voltage drop in the appropriate resistor so as to oppose the bridge output voltage. A reverse voltage is thus created across the appropriate diode, either 84 or 85, preventing it from conducting and hence preventing flow of current to the input transformer. It is so arranged that the voltage from the winding 58 always exceeds that derived from the output of the bridge.

If the phase of the bridge output voltage is reversed it may be seen that an opposing voltage will not be produced in any particular half cycle and current flow to the transformer 71 in response to the bridge output voltage will be unimpeded. As in the previous circuit the variable resistance 72 provides means of attenuating the signal passed to the transformer 71.

It will be apparent that the circuit of this invention may be applied to many other forms of controller.

We claim:

1. An electronic controller for controlling a first physical quantity, said controller having an input (30) and comprising a detector (29) connected to said input providing a first electrical signal dependent upon the value of said first physical quantity; a bridge circuit (4–8; 51–56) providing a second electrical signal dependent upon the difference between a second physical quantity and a predetermined value, said second physical quantity influencing control of said first physical quantity by said controller; a sensing element (4; 51, 52) in at least one arm of said second bridge circuit and responsive to said second physical quantity; a controlling device (30–42, M) controlling said first physical quantity in accordance with said first signal, a diode (14; 59, 60; 84, 85) and an impedance element (10, 11; 61, 32; half of 71) connected in series across the output of the bridge circuit, said detector being connected in series with said impedance element to said input of the controlling device.

2. An electronic controller according to claim 1, wherein the input of the bridge circuit (51–56) is connected to a source of full wave rectified alternating voltage (55), the ouptut of the bridge circuit (51–56) is connected across two parallel-connected circuits each comprising a source of half wave alternating voltage (58, 59 and 58, 60) and a resistor (61, 62) connected in series, the last mentioned sources providing equal voltages and each supplying voltage to the corresponding resistor (61, 62) during opposite half cycles, the resistors (61, 62) being equal, the bridge circuit (51–56) providing an output voltage which exceeds the voltage of the sources when the second physical quantity departs from the predetermined value in one sense and the second electrical signal is derived across the remote ends of the resistors (61, 62).

3. An electronic controller according to claim 1, wherein the input of the bridge circuit (51–56) is connected to a source of full wave rectified alternating voltage (55), the output of the bridge circuit is connected across two parallel-connected circuits each comprising a corresponding half of a first transformer winding (58), a corresponding resistor (77, 78) a corresponding diode (59, 60) and a corresponding half of a second transformer winding (71) connected in series in the order named, the resistors (77, 78) being equal and each being connected to the anode of the corresponding diode (59, 60), and each output terminal of the bridge being connected to the midpoint of the corresponding transformer winding (58, 71).

4. An electronic controller according to claim 3, wherein the anodes of the diodes (59, 60) are interconnected through a variable resistance (79).

5. An electronic controller according to claim 3, wherein the diodes (59, 60) have their cathodes interconnected through a further variable resistor (72).

6. An electronic controller according to claim 1, wherein the input of the bridge circuit (51, 56) is connected to a source of alternating voltage (1), one output terminal of the bridge circuit (51–56) is conneced through a first diode (84) to one end of a pair of serially connected equal resistors (80, 81) and through a second diode (85) to the other end of the resistors (80, 81), the other output terminal of the bridge circuit (51, 56) being connected to the connection between the resistors (80, 81) the diodes (84, 85) having opposite poles connected to the one output terminal, each resistor (80, 81) being connected across the output of a source of half wave rectified voltage (58 and 82; 58 and 83), the last mentioned sources providing equal voltages across each resistor (80, 81) greater than the output signal of the bridge circuit (51–56) and each supplying voltage to the corresponding resistor (80, 81) during opposite half cycles, and the second electrical signal being derived between the other output terminal of the bridge circuit (51–56) and the connection between the resistors (80, 81).

7. An electromechanical controller comprising: reversible motor means (M) connectable to regulator means for quantitatively controlling a first physical condition; input circuit means (30) for controlling said motor means; first bridge circuit means (29) connected to said input circuit means, said frst bridge circuit means including a circuit element (40) quantitatively responsive to said first physical condition; first presetting means (opposite 39) for adjusting the balance point of said first bridge circuit means, said motor means being responsive to an unbalance of said first bridge circuit means, the direction of action of said motor means being determined by the direction of said unbalance; means (38) conneced to said first bridge circuit means and driven by said motor means for rebalancing said first bridge circuit means whereby said regulator means is displaced by an amount determined by the magnitude of the deviation of said first physical condition from a predetermined magnitude established by said first presetting means; second bridge circuit means (4–8; 51–56) connected to said input circuit means, said second bridge circuit means including a circuit element quantitatively responsive to a second physical condition directly related to quantitative control of said first physical condition by said regulator means; second presetting means (9; 56) for adjusting the balance point of said second bridge circuit means, said motor means being responsive to the algebraic sum of the unbalances of said first and second bridge circuit means; and asymmetrically conductive circuit means (3; 14; 59, 60; 84, 85) included in said second bridge circuit means, said asymmetrically conductive means causing said motor means to be responsive to unbalance of said second bridge circuit means in one direction and unresponsive to unbalance thereof in the other direction whereby said second bridge circuit means operates to limit the operation of said motor means when said second physical quantity deviates in a predetermined direction beyond a limit established by said second presetting means.

8. A controller according to claim, wherein said first and second physical quantities are temperatures and said quantitatively responsive circuit elements are temperature sensitive resistors, said regulator means being arranged to control the flow of a heat transfer medium.

9. A controller according to claim 7, wherein said first and second bridge circuit means are energized from a common source of alternating current, said controller comprising phase sensitive detector means included in said input circuit.

References Cited by the Examiner

UNITED STATES PATENTS

| | | |
|---|---|---|
| 2,445,880 | 7/48 | Hathaway et al. |
| 2,505,072 | 4/50 | Sunstein _____ 323—75 X |
| 2,982,908 | 5/61 | Erickson et al. _____ 323—75 X |

LLOYD McCOLLUM, *Primary Examiner.*

MILTON O. HIRSHFIELD, *Examiner.*